United States Patent
Masuda

(10) Patent No.: US 9,154,691 B2
(45) Date of Patent: Oct. 6, 2015

(54) IMAGE CAPTURING APPARATUS, IMAGE CAPTURING METHOD, AND PROGRAM

(71) Applicant: FUJIFILM Corporation, Tokyo (JP)

(72) Inventor: Ken Masuda, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/518,417

(22) Filed: Oct. 20, 2014

(65) Prior Publication Data

US 2015/0036022 A1    Feb. 5, 2015

Related U.S. Application Data

(63) Continuation of application No. PCT/JP2013/061377, filed on Apr. 17, 2013.

(30) Foreign Application Priority Data

Apr. 20, 2012    (JP) .................... 2012-096460

(51) Int. Cl.
*H04N 5/228* (2006.01)
*H04N 5/76* (2006.01)
(Continued)

(52) U.S. Cl.
CPC .......... *H04N 5/23219* (2013.01); *G06K 9/4604* (2013.01); *G06T 5/002* (2013.01);
(Continued)

(58) Field of Classification Search
CPC ........... H04N 5/23219; H04N 1/00251; G06T 2207/10004
USPC ........................... 348/222.1, 231.99
See application file for complete search history.

(56) References Cited

U.S. PATENT DOCUMENTS 8,675,991 B2 * 3/2014 Steinberg et al. ............. 382/282
2004/0095359 A1 * 5/2004 Simon et al. .................. 345/619
(Continued)

FOREIGN PATENT DOCUMENTS

JP   2004-246456   9/2004
JP   2006-053859   2/2006
(Continued)

OTHER PUBLICATIONS

International Search Report PCT/JP2013/061377 dated Jun. 25, 2013.

(Continued)

*Primary Examiner* — Twyler Haskins
*Assistant Examiner* — Quang Le
(74) *Attorney, Agent, or Firm* — Young & Thompson

(57) ABSTRACT

An image capturing apparatus extracts frequency components from image data of a newly captured photograph, divides them into divided sections, compares the frequency components of each of the divided sections of the newly captured photograph and frequency components of corresponding divided sections of a database, obtains a maximum vicinity area, and replaces first extraction components, which are a portion of components extracted from among frequency components outside the maximum vicinity area of each of the divided sections of the newly captured photograph, with second extraction components, which are a portion of components extracted from among frequency components outside the maximum vicinity area of corresponding divided sections of the database, at positions of the frequency components of the newly captured photograph corresponding to the positions of the second extraction components.

17 Claims, 5 Drawing Sheets

(51) Int. Cl.
*H04N 5/232* (2006.01)
*H04N 5/262* (2006.01)
*G06K 9/46* (2006.01)
*G06T 5/00* (2006.01)
*H04N 1/00* (2006.01)

(52) U.S. Cl.
CPC ......... *H04N1/00251* (2013.01); *H04N 5/2621* (2013.01); *G06T 2207/10004* (2013.01); *G06T 2207/20172* (2013.01); *G06T 2207/30201* (2013.01)

(56) References Cited

U.S. PATENT DOCUMENTS

2004/0228528 A1 11/2004 Lao
2006/0034542 A1 2/2006 Aoyama
2007/0229498 A1 10/2007 Matusik et al.

FOREIGN PATENT DOCUMENTS

| | | |
|---|---|---|
| JP | 2006-085678 | 3/2006 |
| JP | 2007-265396 | 10/2007 |
| JP | 2010-244239 | 10/2010 |

OTHER PUBLICATIONS

International Preliminary Report on Patentability, dated Oct. 30, 2014, in corresponding International Application No. PCT/JP2013/061377.

* cited by examiner

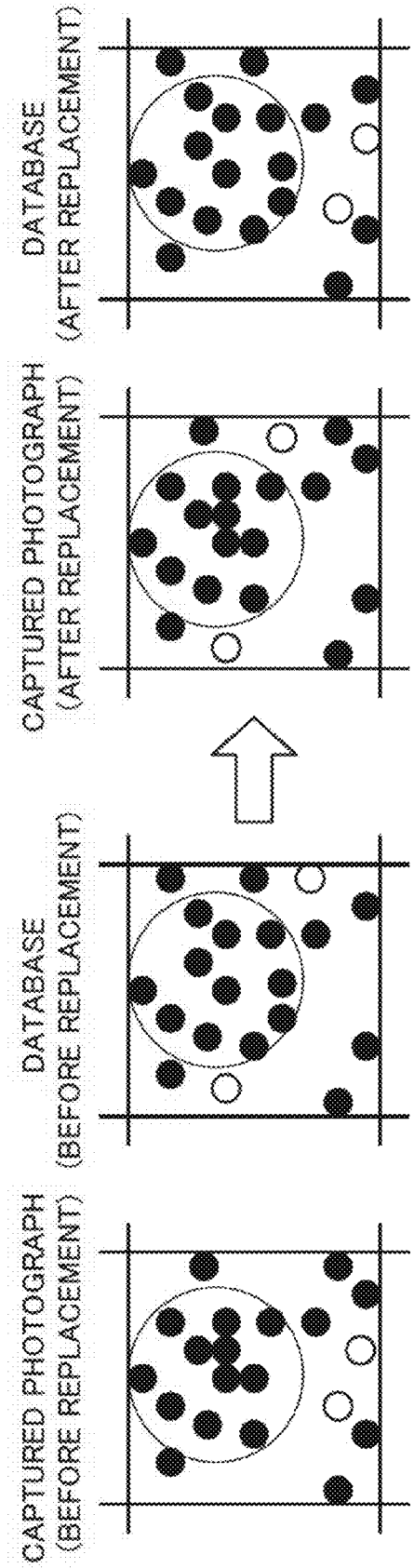

IMAGE CAPTURING APPARATUS, IMAGE CAPTURING METHOD, AND PROGRAM

CROSS-REFERENCE TO RELATED APPLICATIONS

This application is a Continuation of PCT International Application No. PCT/JP2013/061377 filed on Apr. 17, 2013, which claims priority under 35 U.S.C §119(a) to Japanese Patent Application No. 2012-096460 filed Apr. 20, 2012. The above application is hereby expressly incorporated by reference, in its entirety, into the present application.

BACKGROUND OF THE INVENTION

The present invention relates to an image capturing apparatus, an image capturing method, and a program that create a photograph in which a part of a newly captured photograph is replaced with a part of a photograph captured in the past.

BACKGROUND ART

In recent years, it has become easier to capture a photograph with the spread of a digital camera or a mobile terminal having a camera function such as a cellular phone or a smart phone. For example, by means of the so-called self photographing in which a photographer trains a camera on himself (or herself) or persons including himself (or herself) to capture a photograph, the photographer can capture photographs of his (or her) own face over several years. However, in this case, as the photographer gets older, skin condition declines to increase fine wrinkles, flabbiness, swellings, and the like, and as a result, facial expression slightly changes.

In order to solve this problem, in the prior art, an image capturing apparatus in which a captured photograph is subjected to image correction processing such as skin-glamorizing processing (see Patent Literature 1 (JP 2010-244239 A)) or smoothing processing (see Patent Literature 2 (JP 2004-246456 A)), thereby hiding a decline of skin condition or blurring wrinkles, has been proposed. In contrast, as represented by a print sealing machine that creates a photograph printed in a seal, an apparatus in which decoration processing of deforming the eyes to become extremely large regardless of age or putting a glitter on a photograph is performed has also been proposed.

As described above, a person who is an object of a captured photograph has a wish to make his (or her) face in the photograph look much younger than the person really is by hiding a decline of skin condition or blurring wrinkles, and thus, it is desired for the image capturing apparatus to be provided with a function that satisfies such a wish of the person who is the object of the photograph.

SUMMARY OF THE INVENTION

An object of the invention is to solve the problems in the prior art and to provide an image capturing apparatus, an image capturing method, and a program capable of capturing a photograph in which an object looks younger than the actual age of the object.

Solution to Problems

In order to attain the object described above, the present invention provides an image capturing apparatus comprising:
a photograph capturing section that captures a photograph to acquire image data;
a database in which a predetermined frequency component of at least one photograph captured in a past by the photograph capturing section is stored;
a frequency component extracting section that extracts the predetermined frequency component from image data of a photograph that is newly captured by the photograph capturing section;
a region dividing section that divides a frequency component of the newly captured photograph into two or more divided regions;
a maximum neighboring region calculating section that collates a frequency component in each divided region of the newly captured photograph and a frequency component in each corresponding divided region in the database, and calculates a maximum neighboring region where a total number of coincidences of components included in respective frequency components is a maximum; and
a component replacing section that replaces a partial first extraction component extracted from a frequency component outside the maximum neighboring region of each divided region of the newly captured photograph with a partial second extraction component extracted from a frequency component outside the maximum neighboring region of each corresponding divided region in the database, at a position of a frequency component in the newly captured photograph corresponding to a position of the second extraction component.

Also, the present invention provides an image capturing method comprising the steps of:
capturing a photograph to acquire image data;
extracting a predetermined frequency component from image data of a photograph newly captured in the photograph capturing step;
dividing a frequency component of the newly captured photograph into two or more divided regions;
collating a frequency component of each divided region of the newly captured photograph and a frequency component of each corresponding divided region in a database in which the frequency component of at least one photograph captured in a past is stored and calculating a maximum neighboring region where a total number of coincidences of components included in respective frequency components is a maximum; and
replacing a partial first extraction component extracted from a frequency component outside the maximum neighboring region of each divided region of the newly captured photograph with a partial second extraction component extracted from a frequency component outside the maximum neighboring region of each corresponding divided region in the database, at a position of a frequency component of the newly captured photograph corresponding to a position of the second extraction component.

Also, the present invention provides a non-transitory computer-readable recording medium on which a program that causes a computer to execute the respective steps of the image capturing method according to above has been recorded.

According to the present invention, a partial extraction component of a frequency component of a newly captured photograph is replaced with a partial extraction component of the frequency component of a photograph captured in the past, at a position in the newly captured photograph corresponding to the position of the extraction component in the photograph captured in the past. Thus, according to the present invention, it is possible to go back in time to a state before skin condition declines and fine wrinkles, flabbiness, swellings, and the like are increased, and to capture a photograph in which an object looks younger than the actual age of the object.

BRIEF DESCRIPTION OF THE DRAWINGS

FIG. 6 is a conceptual diagram illustrating the state where a first extraction component of the standardized high frequency component of the photograph that is newly captured and a second extraction component of the high frequency component in the database are replaced with each other with respect to the high frequency component shown in FIG. 5A.

DETAILED DESCRIPTION OF THE INVENTION

Hereinafter, an image capturing apparatus, an image capturing method and a program of the invention will be described in detail based on preferred embodiments shown in the accompanying drawings.

Figure 1:
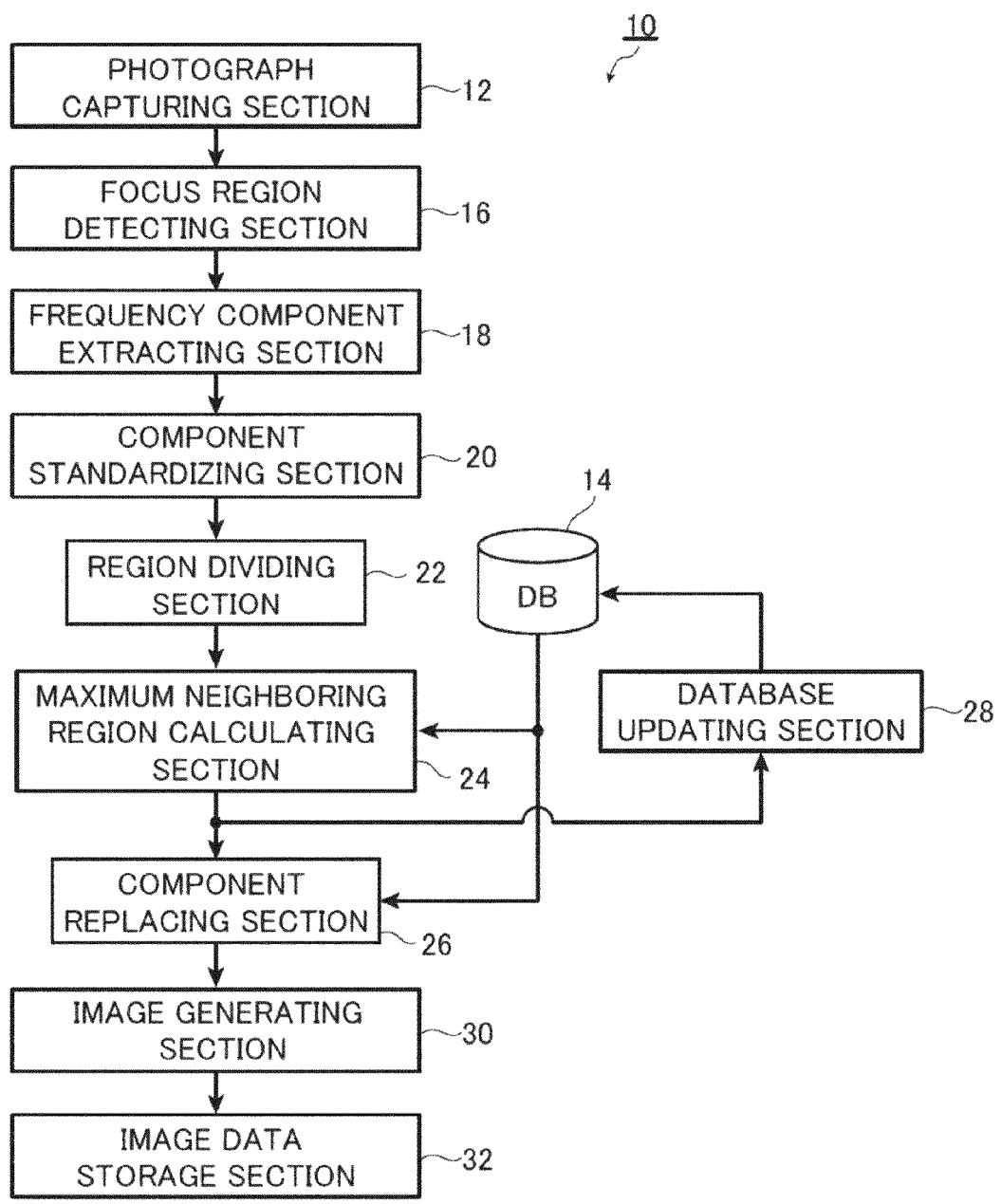
FIG. 1 is a block diagram of an embodiment illustrating a configuration of an image capturing apparatus of the invention.

FIG. 1 is a block diagram of an embodiment illustrating a configuration of an image capturing apparatus of the invention. The image capturing apparatus 10 shown in FIG. 1 is an apparatus that creates a photograph in which a part of a photograph that is newly captured is replaced with a part of a photograph that was captured in the past, and includes a photograph capturing section 12, a database 14, a focus region detecting section 16, a frequency component extracting section 18, a component standardizing section 20, a region dividing section 22, a maximum neighboring region calculating section 24, a component replacing section 26, a database updating section 28, an image generating section 30, and an image data storage section 32.

The photograph capturing section 12 is, for example, a digital camera, or a mobile terminal having a camera function such as a cellular phone or a smart phone, and captures a photograph to acquire image data (digital data) thereof.

The database (DB) 14 stores a predetermined frequency component of at least one photograph that was captured in the past by the photograph capturing section 12.

In the present embodiment, a high frequency component (first frequency component), and an intermediate frequency component (second frequency component) having a frequency lower than a frequency of the high frequency component are extracted as the predetermined frequency component. The frequency of the high frequency component is determined depending on the performance of the photograph capturing section 12, and the frequency of the intermediate frequency component is defined as a value obtained by dividing the frequency of the high frequency component by $2\sqrt{2}$, for example.

The focus region detecting section 16 detects a focus region of the photograph that is newly captured by the photograph capturing section 12.

In the case of self photographing, it is considered that a distance (image capturing distance) between an object (photographer) and the photograph capturing section 12 corresponds to the length (reach) of an arm of the photographer, and a focus position is a central part (normally, position of a nose) of the face.

In the case where the focus position is the position of the nose as described above, it is not essential to detect the focus region.

The frequency component extracting section 18 extracts the predetermined frequency component from the image data of the focus region of the newly captured photograph, and in the present embodiment, as described above, the frequency component extracting section 18 extracts the high frequency component and the intermediate frequency component therefrom.

The component standardizing section 20 standardizes the number of components included in the frequency component in the focus region of the newly captured photograph.

In the case of self photographing, the size of the face of the object is changed depending on the image capturing distance, and thus, the number of pixels per unit area of the captured photograph is changed depending on the image capturing distance. Therefore, the component standardizing section 20 standardizes the number of components included in the frequency component per unit area.

In the case of self photographing, if the image capturing distance is not changed, the size of the face of the object is not changed, and accordingly, the standardization of the frequency component is not essential.

The region dividing section 22 divides the standardized frequency component in the focus region of the newly captured photograph into two or more small regions (divided regions).

The respective divided regions may be small divided regions having approximately the same area like a triangular shape or a honeycomb shape, as well as a rectangular shape, and the respective divided regions may not necessarily have the same shapes or similar shapes.

In addition, the areas of respective divided regions may also be appropriately determined. When the areas of the respective divided regions are different from each other, the respective divided regions may be considered to be the same by performing weighting based on the difference between the areas. Further, adjacent divided regions may have an overlapped part.

The maximum neighboring region calculating section 24 collates the frequency component in each divided region of the newly captured photograph and the frequency component in each corresponding divided region in the database 14, and calculates a maximum neighboring region where the total number of coincidences of the components included in the respective frequency components is the maximum.

The maximum neighboring region calculating section 24 may collate the divided region of the newly captured photograph and the divided region of the database 14 corresponding thereto on one to one basis, or may respectively collate the divided region of the newly captured photograph and plural divided regions around the corresponding divided region in the database 14 to calculate a region where the maximum neighboring region is the maximum.

The component replacing section 26 replaces a partial extraction component (first extraction component) extracted from the frequency component outside the maximum neighboring region of each divided region of the newly captured photograph with a partial extraction component (second extraction component) extracted from the frequency component outside the maximum neighboring region of each corresponding divided region in the database 14, at a position of the frequency component in the newly captured photograph corresponding to the position of the second extraction component.

The database updating section 28 replaces the second extraction component with the first extraction component at a position of the frequency component in the database 14 corresponding to the position of the first extraction component.

The image generating section 30 generates an image after replacement from the frequency component of the newly captured photograph of which the first extraction component is replaced with the second extraction component by the component replacing section 26.

The image data storage section 32 stores image data of the image after replacement.

Next, a schematic operation of the image capturing apparatus 10 will be described according to the image capturing method of the present invention and with reference to the flowchart shown in FIG. 2.

First, a photograph of an object is captured by the photograph capturing section 12, and image data thereof is acquired (step S1).

In the present embodiment, it is assumed that a photographer captures face photographs of himself (or herself) over several years by self photographing, and a high frequency component and an intermediate frequency component of one or more photographs that were captured in the past are stored in the database 14.

Subsequently, a focus region of the photograph that is newly captured by the photograph capturing section 12 is detected by the focus region detecting section 16 (step S2).

For example, regions indicated by circular frames in FIGS. 3 and 4 are the focus regions.

Then, the high frequency component is extracted from the image data in the focus region of the newly captured photograph by the frequency component extracting section 18 (step S3A).

Similarly, the intermediate frequency component is extracted (step S3B).

Figure 3A:
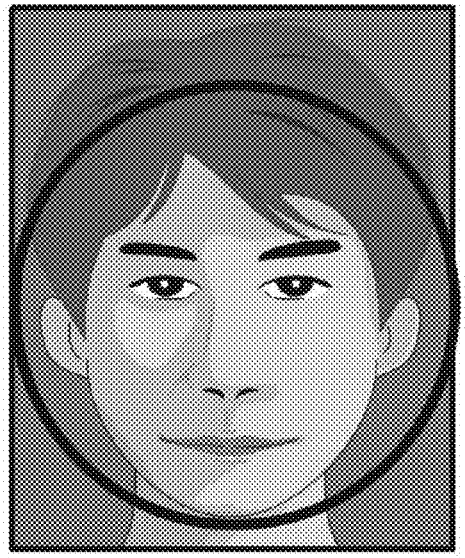
FIGS. 3A and 3B are conceptual diagrams illustrating images of a high frequency component and an intermediate frequency component extracted from image data in a focus region of a photograph that is newly captured.
Figure 3B:
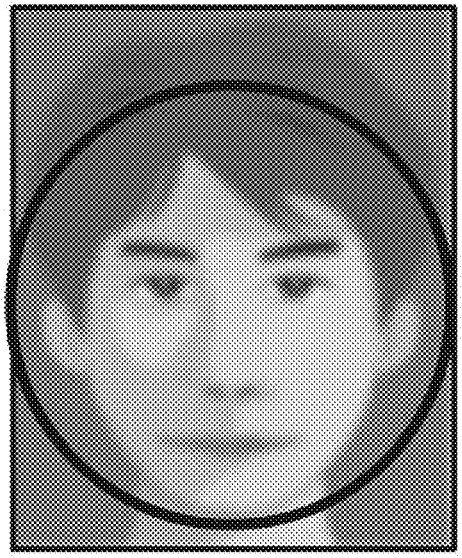

FIGS. 3A and 3B are conceptual diagrams illustrating images of the high frequency component and the intermediate frequency component extracted from the image data of the focus region of the newly captured photograph.

The image of the high frequency component shown in FIG. 3A represents a portion of which the shape changes finely like the eyes, nose, or mouth, for example, and thus, the image is clear. In contrast, the image of the intermediate frequency component shown in FIG. 3B represents a portion of which the shape changes coarsely, and thus, the image is obscure. The components included in the high frequency component and the intermediate frequency component have a fine part and a coarse part corresponding to the shape of each portion of the object.

Subsequently, the number of components included in the high frequency component in the focus region is standardized by the component standardizing section 20 (step S4A).

Similarly, the number of components included in the intermediate frequency component is standardized (step S4B).

Figure 4A:
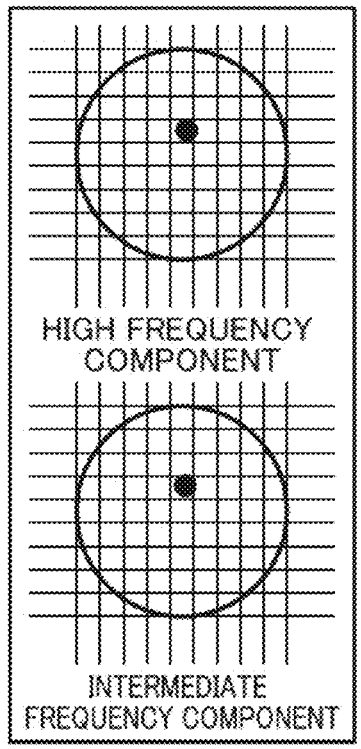
FIGS. 4A and 4B are conceptual diagrams illustrating the states where standardized frequency component in the focus region of the photograph that is newly captured and frequency component stored in a database are divided into divided regions.

Then, as shown in FIG. 4A, the high frequency component standardized in the focus region of the newly captured photograph is divided into divided regions by the region dividing section 22 (step S5A).

Similarly, the intermediate frequency component standardized is divided into divided regions (step S5B).

Figure 2:
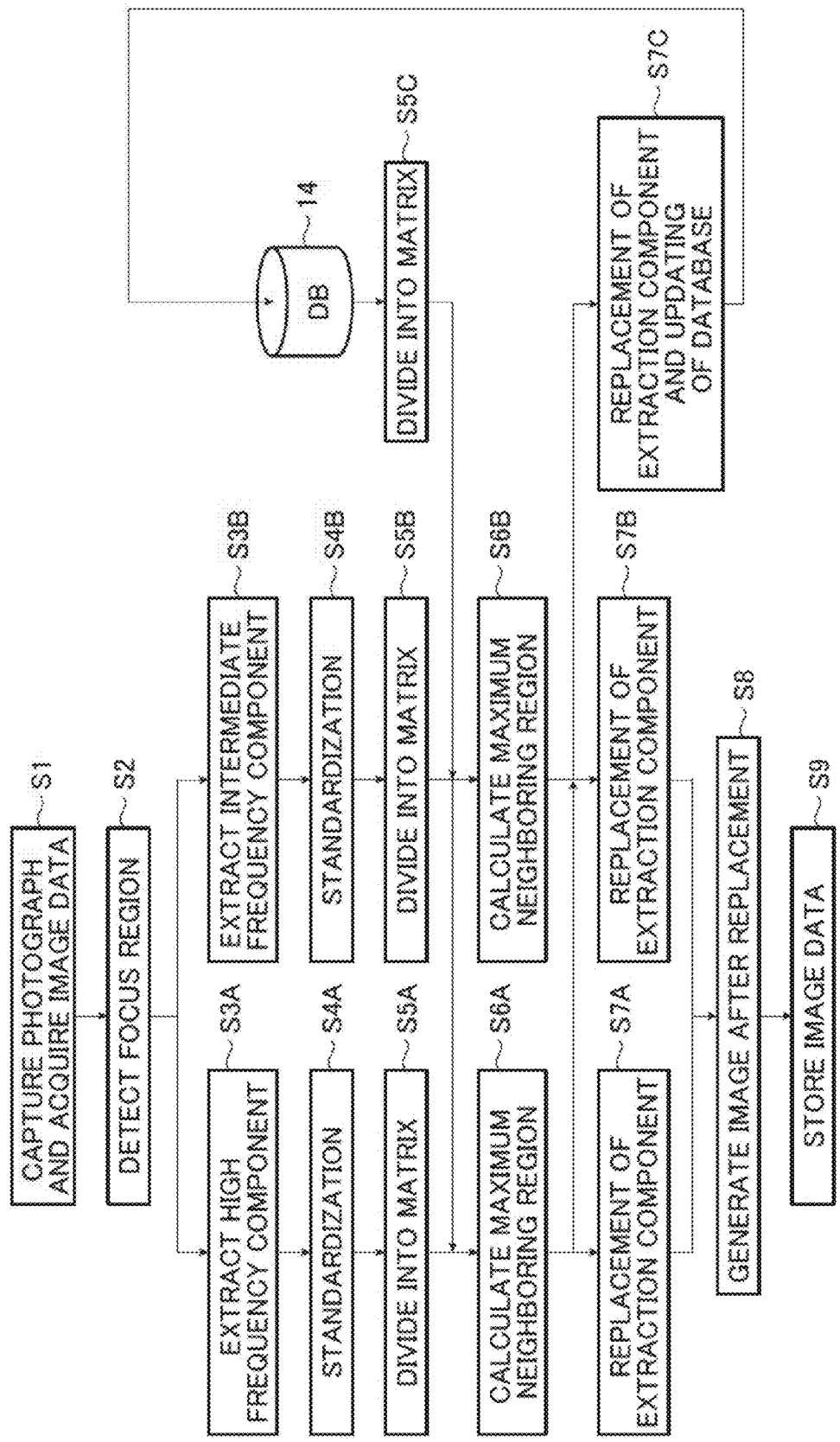
FIG. 2 is a flowchart illustrating an operation of the image capturing apparatus shown in FIG. 1.
Figure 4B:
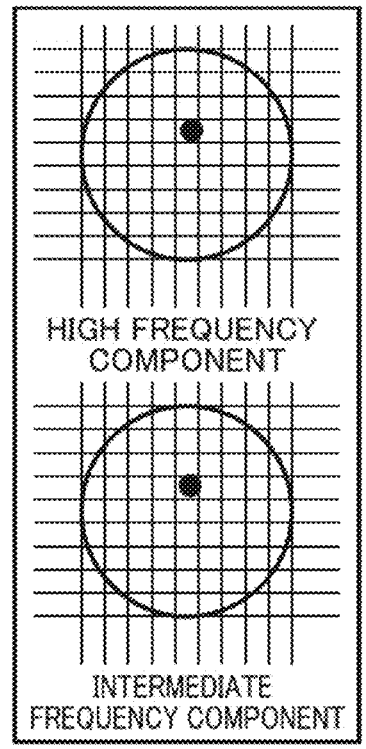

Although shown in brief in FIG. 2, similarly, as shown in FIG. 4B, the high frequency component and the intermediate frequency component stored in the database 14 are respectively divided into divided regions (step S5C). Alternatively, the frequency components of the database 14 may be divided into divided regions in advance.

Subsequently, the maximum neighboring region calculating section 24 collates an extraction component (third extraction component) that is randomly extracted using, for example, a random function from the high frequency component in each divided region of the newly captured photograph and an extraction component (fourth extraction component) that is randomly extracted from the high frequency component in each corresponding divided region in the database 14, and calculates a maximum neighboring region where the total number of coincidences of the components included in the respective extraction components is the maximum (step S6A).

Similarly, a maximum neighboring region is also calculated with respect to the intermediate frequency component (step S6B).

Figure 5A:
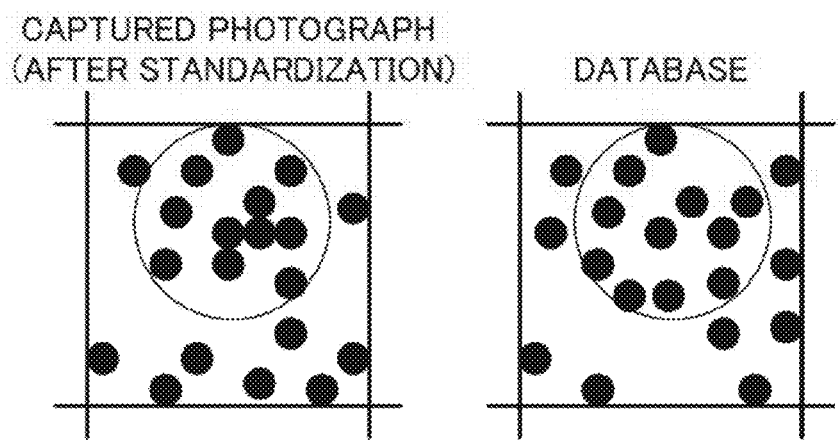
FIGS. 5A and 5B are conceptual diagrams illustrating respective maximum neighboring regions of the high frequency component and the intermediate frequency component.
Figure 5B:
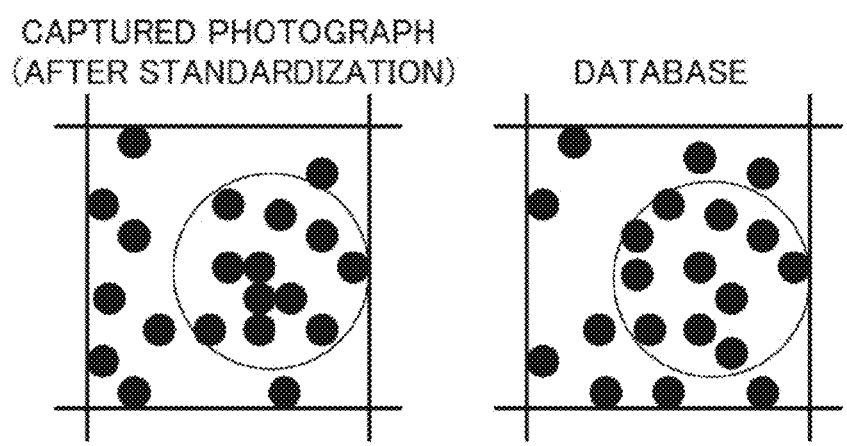

FIGS. 5A and 5B are conceptual diagrams illustrating the respective maximum neighboring regions of the high frequency component and the intermediate frequency component.

In FIGS. 5A and 5B, the rectangular frame represents one divided region shown in FIGS. 4A and 4B for each of the high frequency components and the intermediate frequency components of the newly captured photograph (after standardization) and the database 14, and the circular frame represents the maximum neighboring region. Further, components included in each of the high frequency components and the intermediate frequency components are indicated by the black spots.

Since the maximum neighboring region is determined for each divided region, the maximum neighboring region has a size included in each divided region. Further, the maximum neighboring region has the same position and the same size in the divided regions of the newly captured photograph and the database 14.

Here, a large size of the maximum neighboring region means that the degree of coincidence of the newly captured photograph and the photograph captured in the past in the divided region is large. That is, it means that the newly captured photograph has little change from the photograph captured in the past.

On the other hand, a small size of the maximum neighboring region means that the degree of coincidence of the newly captured photograph and the photograph captured in the past in the divided region is small. That is, it means that the newly captured photograph has much change from the photograph captured in the past.

Subsequently, $\alpha(n-1)$ ($\alpha$ is a factor, n is an integer of $n \geq 1$ indicating the number of times of photographing, and n−1 represents the number of updates of the frequency component of the photograph stored in the database 14) first extraction components that are randomly extracted from the high frequency component outside the maximum neighboring region of each divided region of the newly captured photograph are replaced with $\alpha(n-1)$ second extraction components that are randomly extracted from the frequency component outside the maximum neighboring region of each corresponding divided region in the database 14, at a position of the high frequency component in the newly captured photograph corresponding to the position of the second extraction component, by the component replacing section 26 (step S7A).

Similarly, the replacement is also performed for the intermediate frequency component (step S7B).

On the other hand, the α(n−1) second extraction components that are randomly extracted from the frequency component outside the maximum neighboring region of each divided region in the database 14 are replaced with the α(n−1) first extraction components that are randomly extracted from the frequency component outside the maximum neighboring region of each corresponding divided region of the newly captured photograph, at a position of the high frequency component in the database 14 corresponding to the position of the first extraction component, by the database updating section 28, and thereby, the high frequency component stored in the database 14 is updated (step S7C).

Similarly, the replacement is also performed for the intermediate frequency component.

Here, in the conventional image correction processing such as skin-glamorizing processing or smoothing processing, the size (the amount of information) of the image before and after the processing is changed. In the conventional image correction processing, generally, the image after the processing becomes larger than the image before the processing.

In contrast, the component replacing section 26 and the database updating section 28 replace the first extraction component and the second extraction component with each other. Thus, the photograph after replacement and the size (the amount of information) of the frequency components stored in the database 14 do not change at all before and after the replacement.

In steps S6A, S6B, S7A, S7B, and S7C, it is not essential to randomly extract the components from respective frequency components. As the component extraction processing, for example, the components may be extracted by collating all components or components in an arbitrary place and a reference value. Further, the replacement of the (n−1) components is not essential, and the (n−1) components may be appropriately changed by the factor α.

In the present embodiment, the first extraction component is replaced with the second extraction component by the component replacing section 26, and the second extraction component is replaced with the first extraction component by the database updating section 28, but the first extraction component and the second extraction component can be replaced with each other at the same time by exchanging the first extraction component and the second extraction component.

FIG. 6 is a conceptual diagram illustrating the state where the first extraction component of the standardized high frequency component of the photograph that is newly captured and the second extraction component of the high frequency component in the database are replaced with each other with respect to the high frequency component shown in FIG. 5A. In FIG. 6, the first and second extraction components are indicated by white spots.

As shown in FIG. 6, the first extraction components are erased in the divided region of the newly captured photograph, and the second extraction components are disposed at positions in the newly captured photograph corresponding to the positions of the second extraction component. On the other hand, in the divided region of the database 14, the second extraction components are erased, and the first extraction components are disposed at positions in the database 14 corresponding to the positions of the first extraction components.

Subsequently, an image (photograph) after the replacement is generated by the image generating section 30, from the high frequency component and the intermediate frequency component of the newly captured photograph in which the first extraction component is replaced with the second extraction component (step S8).

Then, finally, image data on the image after the replacement is stored by the image data storage section 32 (step S9).

As described above, in the image capturing apparatus 10, the partial extraction component of the frequency component of the newly captured photograph is replaced with the partial extraction component of the frequency component of the photograph captured in the past at a position in the new photograph corresponding to the position of the extraction component in the photograph captured in the past. Thus, it is possible to go back in time to a state before skin condition declines, and fine wrinkles, flabbiness, swellings, and the like are increased, and to capture a photograph in which an object looks younger than the actual age of the object.

Hereinbefore, an example in which a photograph is captured by self photographing is described, but the present invention is not limited thereto, and may be applied to plural photographs captured over several years.

Further, in the above-described embodiment, two frequency components of the high frequency component and the intermediate frequency component are extracted from the photograph, but the present invention is not limited thereto. For example, only one frequency component may be extracted, or three or more frequency components may be extracted.

The present invention is basically configured as above.

Hereinbefore, the present invention has been described in detail, but needless to say, the present invention is not limited to the above-described embodiments and may be improved or modified in various forms within the scope that does not depart from the gist of the invention.

What is claimed is:

1. An image capturing apparatus comprising:
   a photograph capturing section that captures a photograph to acquire image data;
   a database in which a predetermined frequency component of at least one photograph captured in the past by the photograph capturing section is stored;
   a frequency component extracting section that extracts the predetermined frequency component from image data of a photograph that is newly captured by the photograph capturing section;
   a region dividing section that divides a frequency component of the newly captured photograph into two or more divided regions;
   a maximum neighboring region calculating section that collates a frequency component in each divided region of the newly captured photograph and a frequency component in each corresponding divided region in the database, and calculates a maximum neighboring region where a total number of coincidences of frequency components included in respective frequency components is a maximum; and
   a component replacing section that replaces a partial first extraction component extracted from a frequency component outside the maximum neighboring region of each divided region of the newly captured photograph with a partial second extraction component extracted from a frequency component outside the maximum neighboring region of each corresponding divided region in the database, at a position of the frequency component in the newly captured photograph corresponding to a position of the partial second extraction component.

2. The image capturing apparatus according to claim 1, wherein the maximum neighboring region calculating section collates a third extraction component extracted by predetermined extraction processing from the frequency component in each divided region of the newly captured photograph and a fourth extraction component extracted by the predetermined extraction processing from the frequency component in each corresponding divided region in the database, and calculates the maximum neighboring region where the total number of coincidences of the frequency components included in the respective extraction components is the maximum.

3. The image capturing apparatus according to claim 2, wherein the predetermined extraction processing is to extract the frequency component by collating all components or components in an arbitrary place with a reference value.

4. The image capturing apparatus according to claim 2, wherein the predetermined extraction processing is to extract the frequency component by using a random function.

5. The image capturing apparatus according to claim 1, wherein the component replacing section replaces the partial first extraction component extracted by predetermined extraction processing from the frequency component outside the maximum neighboring region of each divided region of the newly captured photograph with the partial second extraction component extracted by the predetermined extraction processing from the frequency component outside the maximum neighboring region of each corresponding divided region in the database.

6. The image capturing apparatus according to claim 5, wherein the component replacing section replaces $\alpha(n-1)$ said partial first extraction components that are extracted by the predetermined extraction processing from the frequency component outside the maximum neighboring region of each divided region of the newly captured photograph with $\alpha(n-1)$ said partial second extraction components that are extracted by the predetermined extraction processing from the frequency component outside the maximum neighboring region of each corresponding divided region in the database;
wherein $\alpha$ is a factor, n is an integer of $n \geq 1$ indicating a number of times of photographing, and n−1 represents a number of updates of the frequency component of the photograph stored in the database.

7. The image capturing apparatus according to claim 1, further comprising:
a database updating section that replaces the partial second extraction component with the partial first extraction component at a position of the frequency component in the database corresponding to the position of the partial first extraction component.

8. The image capturing apparatus according to claim 7, wherein the database updating section replaces the partial second extraction component that is extracted by the predetermined extraction processing from the frequency component outside the maximum neighboring region of each divided region in the database with the partial first extraction component that is extracted by the predetermined extraction processing from the frequency component outside the maximum neighboring region of each corresponding divided region of the newly captured photograph.

9. The image capturing apparatus according to claim 8, wherein the database updating section replaces $\alpha(n-1)$ said partial second extraction components that are extracted by the predetermined extraction processing from the frequency component outside the maximum neighboring region of each divided region in the database with $\alpha(n-1)$ said partial first extraction components that are extracted by the predetermined extraction processing from the frequency component outside the maximum neighboring region of each corresponding divided region of the newly captured photograph;
wherein $\alpha$ is a factor, n is an integer of $n \geq 1$ indicating a number of times of photographing, and n−1 represents a number of updates of the frequency component of the photograph stored in the database.

10. The image capturing apparatus according to claim 1, wherein the frequency component extracting section extracts a first frequency component and a second frequency component having a lower frequency than that of the first frequency component as the predetermined frequency component, and
wherein the region dividing section, the maximum neighboring region calculating section, and the component replacing section perform processing with respect to each of the first and second frequency components.

11. The image capturing apparatus according to claim 1, further comprising:
a component standardizing section that standardizes the number of components included in the frequency component of the newly captured photograph,
wherein the region dividing section divides the standardized frequency component into divided regions.

12. The image capturing apparatus according to claim 11, wherein the frequency component extracting section extracts a first frequency component and a second frequency component having a lower frequency than that of the first frequency component as the predetermined frequency component, and
wherein the region dividing section, the maximum neighboring region calculating section, the component replacing section, and the component standardizing section perform processing with respect to each of the first and second frequency components.

13. The image capturing apparatus according to claim 1, further comprising:
a focus region detecting section that detects a focus region of the newly captured photograph,
wherein the frequency component extracting section extracts the frequency component from image data of the focus region.

14. The image capturing apparatus according to claim 1, further comprising:
an image generating section that generates an image after replacement, from the frequency component of the newly captured photograph in which the partial first extraction component is replaced with the partial second extraction component.

15. The image capturing apparatus according to claim 14, further comprising:
an image data storage section that stores image data of the image after replacement.

16. An image capturing method comprising the steps of:
capturing a photograph to acquire image data;
extracting a predetermined frequency component from image data of a photograph newly captured in the photograph capturing step;
dividing a frequency component of the newly captured photograph into two or more divided regions;
collating a frequency component of each divided region of the newly captured photograph and a frequency component of each corresponding divided region in a database in which the frequency component of at least one photograph captured in the past is stored and calculating a maximum neighboring region where a total number of coincidences of frequency components included in respective frequency components is a maximum; and replacing a partial first extraction component extracted from a frequency component outside the maximum neighboring region of each divided region of the newly captured photograph with a partial second extraction component extracted from a frequency component outside the maximum neighboring region of each corresponding divided region in the database, at a position of the frequency component of the newly captured photograph corresponding to a position of the second extraction component.

17. A non-transitory computer-readable recording medium on which a program that causes a computer to execute the respective steps of the image capturing method according to claim 16 has been recorded.

* * * * *